United States Patent
Stava

[19]

[11] Patent Number: 6,051,810
[45] Date of Patent: Apr. 18, 2000

[54] SHORT CIRCUIT WELDER

[75] Inventor: Elliott K. Stava, Sagamore Hills, Ohio

[73] Assignee: Lincoln Global, Inc., Cleveland, Ohio

[21] Appl. No.: 09/200,594

[22] Filed: Nov. 27, 1998

Related U.S. Application Data

[63] Continuation-in-part of application No. 09/004,707, Jan. 9, 1998, Pat. No. 5,961,863.

[51] Int. Cl.$^7$ ..................................... B23K 9/09
[52] U.S. Cl. .............................. 219/137 PS; 217/130.33; 217/130.51
[58] Field of Search ......................... 219/137 PS, 130.21, 219/130.31, 130.32, 130.33, 130.5, 130.51

[56] References Cited

U.S. PATENT DOCUMENTS

| | | |
|---|---|---|
| 3,461,264 | 8/1969 | Nelson et al. . |
| 3,777,103 | 12/1973 | White et al. . |
| 3,947,655 | 3/1976 | Gonzalez et al. . |
| 4,544,825 | 10/1985 | Cook . |
| 4,658,112 | 4/1987 | Thompson . |
| 4,717,807 | 1/1988 | Parks et al. . |
| 4,866,247 | 9/1989 | Parks et al. . |
| 4,877,941 | 10/1989 | Honma et al. .................... 219/137 PS |
| 4,897,523 | 1/1990 | Parks et al. . |
| 4,972,064 | 11/1990 | Stava . |
| 5,001,326 | 3/1991 | Stava . |
| 5,003,155 | 3/1991 | Chai et al. . |
| 5,059,765 | 10/1991 | Laing . |
| 5,148,001 | 9/1992 | Stava . |
| 5,676,857 | 10/1997 | Parker . |
| 5,686,002 | 11/1997 | Flood et al. . |
| 5,961,863 | 10/1999 | Stava .................................. 219/137 PS |

*Primary Examiner*—Clifford C. Shaw
*Attorney, Agent, or Firm*—Vickers, Daniels & Young

[57] ABSTRACT

An apparatus and method of short circuit arc welding two spaced ends of two pipe sections at a groove between the two pipe sections. The method and apparatus include the use of a cored metal electrode and moving the electrode toward the groove as the electrode is moved along the groove and about the outer peripheral surface of the pipe sections during the welding operation. The cored electrode is melted by an electric cycle which comprises a transfer portion and a plasma portion. The plasma portion is controlled to bridge the gap between the pipe sections for laying a root bead along the groove. The cored electrode is preferably a self-shielding electrode and includes alloying components in the core to form a root bead having a substantially similar composition as the composition of the two pipe sections. The apparatus and method has a selector to control the polarity of the individual cycles of a total welding procedure.

53 Claims, 5 Drawing Sheets

SHORT CIRCUIT WELDER

This application is a continuation-in-part of prior application Ser. No. 09/004,707 filed Jan. 9, 1998 now U.S. Pat. No. 5,961,863.

The invention relates to the art of welding with an electric arc and more particularly to an improved method and apparatus for short circuit welding, especially for the welding together of two steel plates, such as two pipe sections.

INCORPORATION BY REFERENCE

The present invention relates to an improvement in spatter controlled systems and heat control systems of the general type described in U.S. Pat. No. 4,972,064. This prior issued patent is incorporated by reference herein and background information and for their discussion of concepts in the spatter control area to which the present invention is specifically directed.

Also incorporated by reference is U.S. Pat. No. 5,676,857. This prior issue patent is incorporated by reference herein as background information and for its discussion of welding sections of pipe together.

BACKGROUND OF THE INVENTION

This invention relates to the field of arc welding using a consumable electrode and more particularly to an improved apparatus and method of short circuiting arc welding two steel plates, such as two pipe sections, together by use of a cored electrode.

In the art of welding the ends of large diameter pipe, it is conventional to machine the ends of each pipe to provide an external bevel and a narrow flat land; and to bring the machined ends into axle alignment with the lands in close but usually spaced relationship to form a weld groove which includes a gap between the two ends of the pipe. Once the pipes are in position, one or more welding heads are moved around the pipe so as to effect a 360° weld. The weld is usually made in several steps. First, a root pass is made where at least the inner edges or lands of the pipes are fused and the gap between the lands filled with weld metal. Thereafter, several filler passes are made wherein the space formed by the bevel is filled so that the weld metal is at least flush with the outer surface of the pipe.

Just before and during the root pass, the ends of the pipe must be in accurate alignment with one another so as to form a quality weld between the two pipe ends. The root pass is a very critical part of the welding operation. Once the root pass is completed, the alignment of the pipes is assured and the welding of the next joint down the line can be commenced. Thus, during the root pass, a 100% sound weld bead must be laid. Soundness of the weld bead means the complete fusion of both the lands clear through to the inner surface of the pipes and the complete filling of the gap between the lands with the weld metal. Depositing of the weld metal in the gap is difficult because the weld must be made by moving the weld heads around the pipe such that the welding position varies from down-hand welding, vertical up or down welding, to overhead weld as the root pass is formed around the pipe. During the root pass, the pipe sections must be maintained in alignment throughout the root pass so as to form a quality weld. Typically, the pipes are clamped together to maintain the pipe alignment during welding. In addition to weld position complications and pipe alignment concerns, the weld metal formed during the root pass should fill the gap between the pipe sections, but the weld metal should not be allowed to pass through the gap and accumulate on the interior surface of the pipe. The weld bead should form a relatively smooth surface with respect to the interior of the pipe which has very little, if any, protrusion into the interior of the pipe. Excessive protrusion of the weld bead in the pipe can: 1) create problems with apparatuses running inside the pipes to detect the soundness of the pipe system, and 2) cause unwanted fluid mixing and turbulence as the fluids are transported through the pipe system.

In order to overcome the problem of the weld bead protruding into the interior of the pipe, it is common practice to make a root pass from the interior of the pipe. Such a welding method insures that the land of the weld bead during the root pass is controlled so as to prevent unwanted protrusion into the interior of the pipeline. However, such a welding method requires specially designed and costly equipment. In addition, such a welding method is very time-consuming and cost-preventative in various types of applications. Furthermore, such a welding method can only be used for large diameter pipes. Smaller diameter pipes cannot accommodate the welding apparatus inside the pipe. Another method of welding which prevents protrusion of the weld bead into the interior of the pipe is the use of backplates or back-up shoes positioned on the interior of the pipe and over the gap between the pipe sections. The backplate prevents the weld bead from protruding into the interior of the pipe sections during the root pass of the weld bead. However, the use of backplates is also very time-consuming and is limited to relatively large diameter pipes. In addition, the backplate, in many instances, becomes welded to the interior of the pipe section during the laying of the root pass. Consequently, the backplate must later be removed which can be both costly and can adversely damage the weld bead during the removal of the welding plate.

A welding apparatus which overcomes many of the problems associated with past pipe welding methods is disclosed in U.S. Pat. No. 5,676,857. This patent discloses an improvement in the welding of the end of two pipe sections by the use of a welding apparatus having two welding bugs which continuously move on a track around the periphery of the pipe. The welding bugs include a special short circuiting power source to apply a root bead between the two ends of a pipe. The patent discloses that by using this system of welding with the proper bug speed and welding wire speed, only a slight burn through each edge of the bevel occurs and a small flat weld is formed on the interior of the pipe, thus eliminating the need to run an initial root pass from the interior of the pipe or to use other types of equipment inside the pipe such as a backplate. Although the method of welding disclosed in U.S. Pat. No. 5,676,857 overcomes several of the problems associated with the welding of pipe sections together, problems associated with the alloy composition of the weld metal of the root bead and the shielding of the weld metal of the root bead from the adverse affects of the atmosphere remain a problem.

The short circuiting power source is designed to be used with a solid wire electrode and, during welding, the weld metal is protected from the atmosphere by use of various types and blends of shielding gas. Although the use of a solid wire and shielding gas produces an excellent weld bead in many environments, the short circuiting welding method has several limitations when used to weld together the pipe sections. Because solid wire electrodes are used, the composition of the weld bead is limited to the available alloy compositions of electrodes for use in short circuit welding. The composition of the weld metal should closely match the composition of the metal pipe to form a strong and durable weld bead. Because the composition of the pipe will vary depending on the application of use for the pipe, problems could arise with the obtaining of a solid wire electrode which forms a weld metal that bonds with the pipe sections with optimum characteristics.

Another limitation of the short circuiting welding process is that a shielding gas must be used to protect the weld bead from the adverse effects of the environment. The welding apparatus must include an arrangement for storing and directing shielding gas to the area of welding. Such an arrangement must include a mounting arrangement for the containers of shielding gas, regulators, flow meters, hoses, and other materials necessary to direct the shielding gas to the welding area during welding. The shielding gas prevents oxygen, nitrogen, hydrogen and other compounds in the atmosphere from reacting with the molten metal and/or being trapped in the molten metal. These elements can cause porosity in the weld bead, cracking of the welding bead, spattering of the weld metal, etc., which can significantly compromise the strength and quality of the weld bead. The use of a shielding gas in a controlled indoor environment is effective in preventing the adverse effects on the weld bead from the environment; however, the use of shielding gases in an outdoor environment are highly susceptible to the effects of wind during the welding process. In order to minimize these effects, special shields must be erected around the perimeter of the electrode to shield the shielding gas from the wind during welding. The use of such shields or other welding configurations to minimize the effects of the atmosphere on the weld bead is both costly and significantly complicates the weld apparatus arrangement.

In view of the problems associated with welding of pipe sections in various types of environments and for producing a high quality weld bead having a composition substantially similar to the composition of the pipes that are being welded together, there is a need for an improved welding method and apparatus which can overcome such problems during the welding of pipe.

SUMMARY OF THE INVENTION

The present invention relates to a method and apparatus of short circuit arc welding together two steel plates, preferably on one side of the plates. Preferably, the method and apparatus of short circuiting arc welding is used to weld together pipe sections together and form a root bead between the two pipe sections; however, the invention has broader applications and can be used to weld together a variety of metal objects, in a variety of ways, in a variety of environments.

In accordance with the preferred embodiment of the present invention, there is provided two pipe sections which are positioned together and form a groove between the ends of the two pipe sections, a welding carriage positioned around the groove formed by the two pipe sections, a consumable cored electrode, a power supply with a positive and negative terminal, a welding current circuit which applies a welding current with a given time base profile across the groove between the pipe sections and the consumable cored electrode. The pipe sections are preferably aligned by the use of clamps. The clamps maintain the pipe sections together at least until a root bead has been applied to the groove between the pipe sections. Preferably the pipe sections are aligned such that a small gap exists in the groove that is formed by the two pipe sections. The welding carriage preferably extends at least 180° around the circumference of the groove and preferably 360° around the circumference of the groove. The welding carriage is designed to slide along a track as it moves around the circumference of the groove, which track is secured about the periphery of the pipe. The welding carriage includes a drive motor which in conjunction with rollers or other types of slide bearings allows the welding carriage to slide along the track around the circumference of the groove at a desired speed. The welding carriage includes a mechanism which controllably moves the consumable cored electrode toward the groove during the welding process. The mechanism for controlling the movement of the cored electrode may be integrated with or separate from the mechanism for controllably moving the carriage about the groove during welding. The welding current circuit includes a first circuit for controlling the current flow during the short circuit condition wherein the molten metal at the end of the consumable cored electrode is primarily transferred into the molten metal pool within the groove by surface tension action. The transfer current includes a high current pinch pulse across the shorted melted metal which helps facilitate the transfer of the molten metal from the electrode to the weld pool. The welding current circuit also includes a second circuit to create a melting current. The melting current is a high current pulse which is passed through the arc which preferably has a preselected amount of energy or wattage used to melt a relatively constant volume of metal at the end of the consumable cored electrode when the electrode is spaced from the welding pool.

In accordance with another aspect of the present invention, the cored electrode includes a flux system within the cored electrode to provide a shielding gas during the welding process.

In accordance with another aspect of the present invention, the consumable cored electrode includes alloy metals in the core so as to obtain a weld bead composition which is substantially similar to the composition of the pipes which are being welded together. A weld bead having a composition which closely matches the composition of the pipe sections forms a strong, durable, high quality weld bead. Some cored electrodes require shielding gas, especially when used for alloying.

In accordance with another aspect of the present invention, the second circuit of the welding current circuit provides a high energy boost during the initial portion of the arcing condition. The high current boost preferably has a preselected I(t) area or energy for melting a relatively constant volume of metal on the end of the consumable wire when the wire is spaced from the welding pool. The energy created during the plasma boost is preferably sufficient to create a spherical metal ball having a diameter of no more than twice the diameter of the welding wire. Preferably after the initial high current plasma boost current, the high current is maintained for a preselected period of time and then subsequently decayed over a period of time until the desired amount of energy or wattage is applied to the electrode to melt the desired volume of the electrode.

In accordance with still another aspect of the present invention, the welding current circuit limits the amount of energy directed to the electrode so as to prevent the unnecessary melting of the ends of the pipe sections during the application of the weld bead and/or to maintain too hot of a weld bead during welding to thereby prevent molten metal from passing through the gap between the ends of the pipe sections and into the interior of the pipe sections.

In accordance with another aspect of the present invention, the welding current circuit includes a circuit to produce a background current. The background current is a low level current which is maintained just above the level necessary to sustain an arc after the termination of a short circuit condition. The background current is preferably maintained throughout the welding cycle to insure that the arc is not inadvertently extinguished during welding.

In accordance with another aspect of the invention the welder includes a controller for shifting between polarity during the welding process to obtain a desired weld puddle heat.

By using the STT welder of The Lincoln Electric Company or STT short circuit welding process practiced by this welder with a core electrode, a gasless welding process is obtained. This allows pipe welding in remote areas of the world. When using a self shield cored electrode, the polarity is normally electrode negative. When using the electrode negative process of the STT welder, the workpiece puddle is hot and the cooling of the puddle requires time allowing the bead to pull back. Consequently, the STT process involves reducing the background current to reduce the heat in the puddle. This correction decreases the amount of heat in the total welding process. By reversing the polarity of the STT welder to an electrode positive condition, the workpiece puddle is too cold. In accordance with an aspect of the invention, the STT welder or process shifts between the standard electrode negative polarity to electrode positive polarity during the total welding process. In this manner the heat is controlled without changing the level of the background current. The heat of the puddle is controlled to a selected temperature by adjusting the ratio of negative electrode to positive electrode welding.

The primary object of the present invention is the provision of a short circuiting arc welding system and method which forms a high quality weld bead between two metal plates.

Another object of the present invention is the provision of a short circuiting arc welding system and method which accurately tracks a desired current profile during the welding of two metal plates together.

Yet another object of the present invention is the provision of a short circuiting arc welding system and method which forms a high quality root bead along the groove of the ends of two pipe sections.

Still another object of the present invention is the provision of a short circuiting arc welding system and method for applying a controlled amount of energy to the electrode to form a weld bead in the groove between two pipe sections without causing molten metal to pass through the groove and into the interior of the pipes.

A further object of the present invention is the provision of a system and method which forms a weld bead without the need of external shielding gases.

A further object of the present invention is the provision of a system and method as defined above which produces a weld bead having a composition which is substantially similar to the composition of the pipe being welded.

Yet another object of the present invention is the use of a cored electrode in a short circuiting weld apparatus to form a high quality weld bead.

A further object of the invention is the provision of an apparatus and method of short circuit welding, which apparatus and method involves changing the polarity of the weld current during a welding process.

Another object of the present invention is the provision of an apparatus and method, which apparatus and method controls the heat of the weld puddle by adjusting the ratio of electrode positive current to electrode negative current, either during a cycle or from one cycle to the next cycle.

Yet a further object of the invention is the operation of an STT welder without the need for a shielding gas and with the control of the weld puddle temperature by polarity ratio adjustment.

Other objects and advantages will become apparent from the following description taken together with the accompanied drawings.

PREFERRED EMBODIMENT OF THE INVENTION

Figure 1:
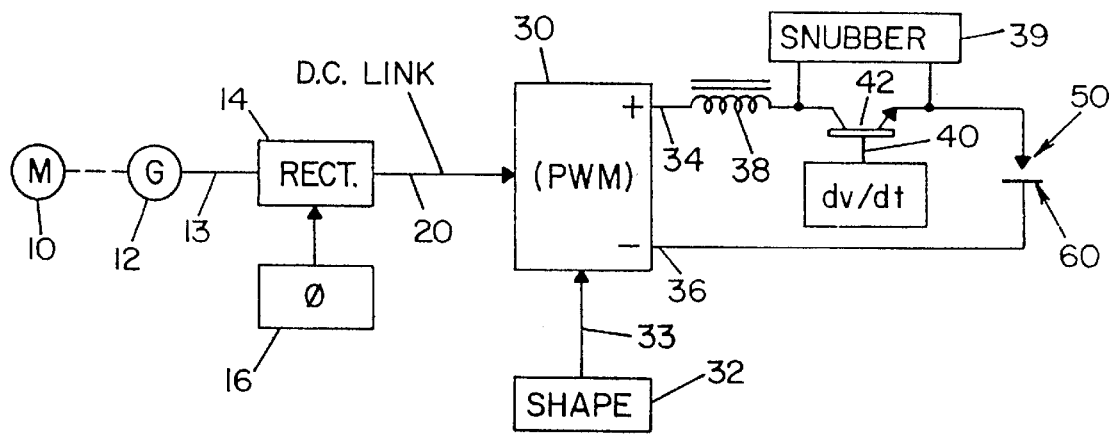
FIG. 1 is a wire diagram illustrating the broad aspect of the welding control circuit of the present invention.

Referring now to the drawings wherein the showings are for the purpose of illustrating the preferred embodiment of the invention only and not for the purpose of limiting same, FIG. 1 illustrates a short circuiting arc welding system connected to the output of a DC power supply. The preferred type of short circuiting welding is SURFACE TENSION TRANSFER or STT type of welding. The welding circuit and control arrangement for such type of welding is disclosed in U.S. Pat. No. 4,972,064, which patent is incorporated herein. Therefore, only a general discussion of the welding circuit will be discussed below.

The power supply is a D.C. power supply preferably made up of a motor 10, such as a gas motor, which powers a generator 12 to produce an AC current 13. The AC current 13 is then rectified by rectifier 14 to form a DC current 20. A phase controller 16 controls the rectifier 14 to produce a substantially uniform DC current 20. DC current 20 is then directed into a pulse with modulator 30. The shapes of the pulse are controlled by shaping circuit 32 to thereby create a desired pulse with the DC current 20 through output terminals 34, 36. As can be appreciated, the power supply need not be a rectified output but can be any other appropriate DC source.

The DC current from the pulse width modulator 30 is directed across a welding area which includes a consumable cored electrode 50 and workpiece 60.

Figure 4:
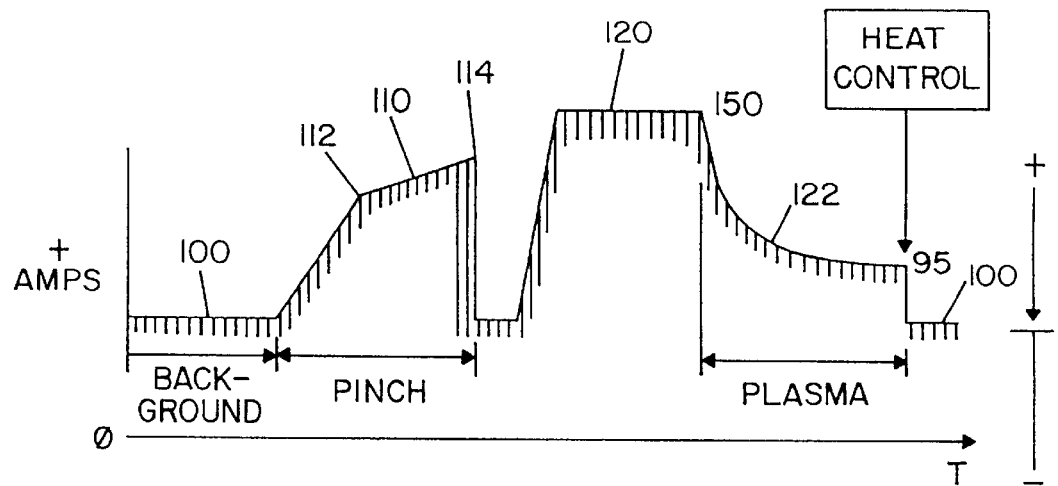
FIG. 4 is a current graph illustrating a representative curve profile of a single welding cycle employed in a system or method used in the present invention wherein the electrode is the positive contact and the workpiece is a negative contact.
Figure 5:
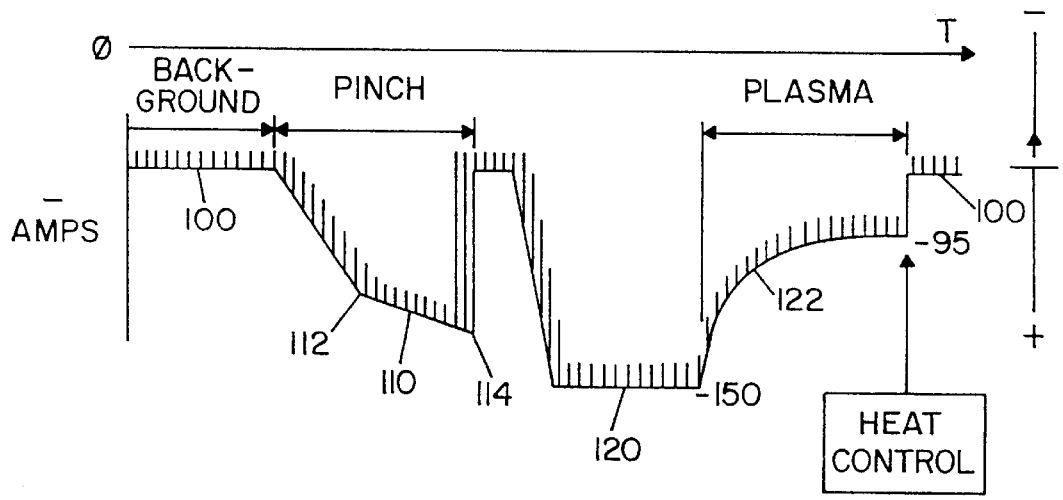
FIG. 5 is an inverted curve profile of a single welding cycle similar to the one shown in FIG. 4 wherein the electrode is negative and the workpiece is positive.

Referring to the welding of the workpiece 60, electrode 50 alternates between a short circuit condition when the electrode 50 engages workpiece 60 and an arcing condition where the electrode 50 is spaced from the workpiece 60. During the arcing condition, an electric arc is created between the workpiece 60 and the electrode 50 for purposes of melting and maintaining molten the end of the electrode as it is fed toward workpiece for a subsequent short circuit condition. This type of welding cycle is schematically illustrated in FIGS. 4 and 5. As shown in FIGS. 4 and 5, the welding cycle alternates between a short circuit condition and a plasma condition.

During the plasma condition, it is necessary that an arc is created and maintained at all times for the purpose of smooth and effective welding. The welding cycle which is repeated several times per second must be accurately controlled for the purpose of reducing spatter at various times during the welding cycle. Pulse width modulator 30 operates at a high frequency. In the preferred embodiment, the operating frequency of the pulse width modulator controller 30 is 20 kHz with a width of the successive current pulse being determined by the voltage on line 33 from shape controller 32. As the feedback control system demands more current in the welding cycle, a higher voltage appears on line 33 causing a wider pulse during the next pulse from the pulse width modulator 30. Thus, the demanded current for the welding cycle is changing 220,000 times each second. Since the highest rate of the welding cycle is generally in the neighborhood of 100 to 400 cycles per second, many update pulses are provided during each welding cycle. In accordance with known practice, the welding current circuit includes a premonition circuit having an output line 40 for controlling switch 42.

The welding circuit directs current to work area in accordance with the operation of the pulse width modulator controller 30 until the dr/dt (where r is the electrode resistance), di/dt or dv/dt indicates an upcoming fuse during the pinch cycle. When this detection occurs, the logic on line 40 changes polarity to open switch 42. This places resistor or snubber 39 in series with main choke 38. Since the main choke has a small inductive reactance, very little energy is stored in the welding current circuit. Consequently, the current flow caused by the welding circuit between the electrode and the workpiece is immediately dropped to a level determined by resistor 39.

In accordance with the present invention, there is added to the welding current circuit a generally parallel background current circuit. The background current circuit continues to provide five to seven amps of current across the workpiece irrespective of the operating condition of the welding circuit. As a result, the background current insures that at least five to seven amps of current pass between the electrode and the workpiece at all times during the welding cycle, thereby preventing the extinguishment of the arc between the electrode and the workpiece during any phase of the welding cycle.

Figure 2:
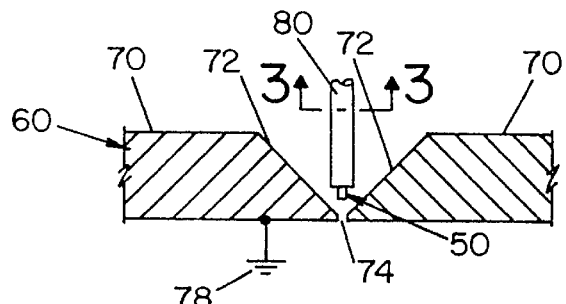
FIG. 2 is a partial view of the groove between two pipe section ends and the electrode position in the groove to form a root bead.
Figure 3:
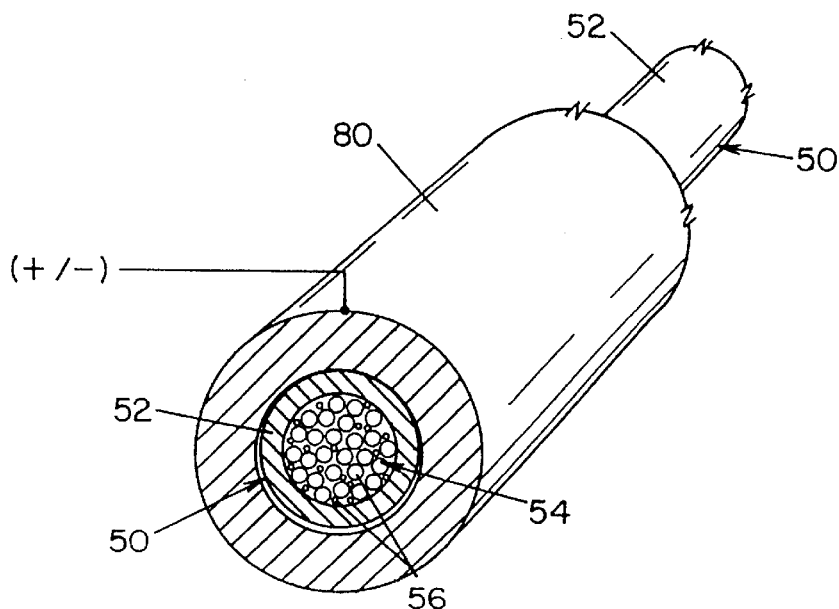
FIG. 3 is a cross sectional view of the electrode nozzle and a cored electrode therein.

Referring to FIGS. 2 and 3, pipe edges 70 illustrate each having a beveled surface 72 which forms a groove between the pipe edges. Pipe edges are spaced apart such that a gap 74 exists between the pipe edges. In accordance with known practice, the pipe edges are positioned and secured together, preferably by clamps until at least the root bead is applied to the groove between the pipe edges, thereby filling the gap 74. A pipe ground 78 engages the pipe to complete the arc circuit between electrode 50 and the pipe. Electrode 50 is directed into the groove between the two pipe ends by electrode nozzle 80. During the welding cycle, the electrode is fed through electrode nozzle 80 so as to transfer the molten metal at the end of the electrode into the groove between the pipe ends to form a root bead.

Referring to FIG. 3, electrode 50 is a consumable cored electrode which includes an outer metal sheath 52 and an electrode core 54. Preferably the metal electrode sheath 52 is made up of carbon steel, stainless steel or some other type of metal or metal alloy. Preferably the composition of the metal sheath is selected to be similar to the base metal component of the pipe sections. The electrode core 54 preferably includes fluxing agents 56 and/or alloying metals. Fluxing agents 56 may include compounds to create a slag over the weld bead to protect the weld bead until it solidifies, to retain the weld bead in position until it solidifies and/or to shield the weld metal during the formation of the weld bead. The fluxing agents may also include components which produce a shielding gas to protect the root bead from the adverse effects of the environment. Preferably the fluxing agents include fluoride and/or carbonate to generate a shielding gas during welding so as to eliminate the need for external shielding gases during welding. The use of such an electrode greatly simplifies the welding apparatus. The need for a source and arrangement for an external shielding gas is eliminated. In addition, the need for a special shield to protect the weld bead from the environment since the shield gas forms at the weld bead, thus protects the weld bead in all types of the environment. The slag which forms on the weld bead further shields the weld bead from the environment, thus resulting in the formation of quality weld beads. Heretofore, a flux cored electrode was not used in this type of short circuiting welding. Surprisingly, the flux cored electrode worked well in the short circuiting welder and formed a shielding gas and slag which adequately protected the weld bead from the deleterious effects of the atmosphere. The alloying agents are also preferably included in the electrode core 54. The alloying agents are preferably selected such that the alloying agents in combination with the composition of the metal electrode sheath 52 form a weld bead having a composition substantially similar to the metal composition of the metal pipes. The flux cored electrode provides versatility to the welding method and apparatus in that the electrode both provides adequate protection to the weld bead during welding without need of external shielding gases and forms a weld bead with the same or closely the same composition of the pipe metal, thereby forming a high quality weld bead in all types of environments and with a wide variety of pipe metal compositions.

Referring now to FIGS. 4 and 5, the operation of the preferred embodiment of the present invention is schematically illustrated. FIG. 4 shows a desired current profile to produce low spatter and to prevent the weld bead from passing through the gap 74 and into the interior of the pipe system. This current profile is divided into a pinch portion, a plasma boost portion, a plasma portion and a background portion wherein the arc is to be maintained. In the current profile illustrated in FIG. 4, pinch portion 110 includes a break point 112 and a premonition circuit operating point 114. The plasma boost portion 120 of the current profile includes a decaying portion 122 referred to as the plasma portion. The plasma boost portion, which is critical to the operation of the spatter control system, is the constant current portion prior to the decay portion; however, the decaying portion 122 can be referred to as the end of the plasma boost portion or the start of the plasma portion. Following the decaying portion 122, the current control circuit shifts to the background current level 100 which maintains the plasma or arc.

The current control circuit, in accordance with the present invention, maintains a preselected background current level, thereby preventing the current level through the arc from ever falling below the preselected current low current level and allowing the arc to extinguish.

The current control circuit is designed to produce all the melting of the electrode during the plasma boost and plasma portion of the welding cycle. Further melting of electrode 50 does not take place when the background current level 100 occurs since the IR necessary for melting the electrode is not obtainable through an arc maintained only by the background current. Thus, the background current only serves to maintain the arc and the ball of molten metal in the molten state. The amount of molten metal at the end of electrode 50 which is formed by the plasma boost and plasma is selected to melt a preselected volume of molten metal at the end of the electrode, and the plasma portion of the current is reduced to the background current once the preselected volume is obtained. The duration of the plasma boost and plasma portion is also selected to prevent unnecessary melting of the metal around gap 74 of pipe ends 70. Such over-melting of the metal can result in the weld metal seeping into the interim of the pipe sections. During the formation of the molten metal ball at the end of the electrode during the plasma portion of the current, the jet forces of the high current repel the melted metal from the welding pool until the preselected amount of molten metal has been melted at the end of the electrode. Once the current is reduced, the molten metal is allowed to form into a ball and the molten metal pool in the groove is allowed to stabilize, thereby allowing for a smooth contact between the substantially spherical ball and the quelled weld metal pool. The desired amount of molten metal at the end of the electrode is controlled by directing a preselected amount of energy or wattage into the electrode during the plasma portion of the welding cycle. All during the time the molten metal ball is being formed at the end of the electrode, the core components are releasing shielding gases to shield the molten ball and the weld metal in gap 74 from the atmosphere. The shield gases continue until the molten ball is transferred into the molten metal in gap 74.

Once the molten metal ball is formed during the plasma boost and the plasma portion of the welding cycle, the molten ball is forced into the molten pool by feeding the electrode into the pool, thereby forming a short circuit condition. When the melted metal ball engages the molten metal pool, it is transferred into the pool by surface tension. This action causes an ultimate necking down of the molten metal extending between the pool and the wire in the electrode, and then a rupture and separation of the ball from the wire occurs. Since there is only a low background current during the separation, little if any spatter occurs. Preferably, the current control circuit monitors the necking of the molten metal ball such that when the neck rapidly reduces in diameter by electric pits, the current flow during the pinch curve 110 increases more gradually until a detection of an impending fuse is obtained. Once the detection of an impending fuse occurs, the current is reduced to the background current until the molten metal at the end of the electrode transfers into the weld pool.

Figure 6:
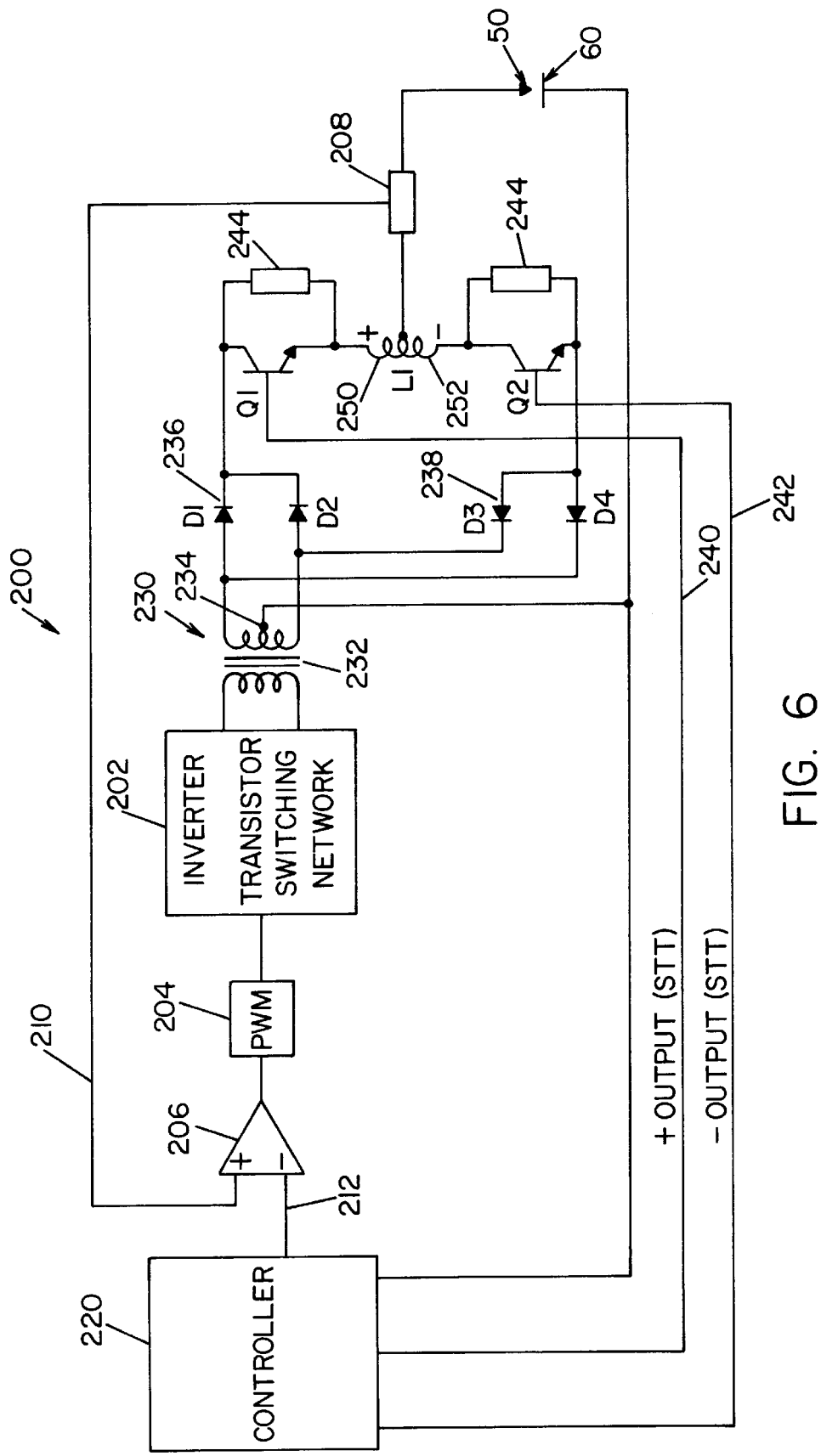
FIG. 6 is a wiring diagram of a welder to perform the method of selecting the polarity of the weld cycles in a welding process using the short circuit procedure.
Figure 7:
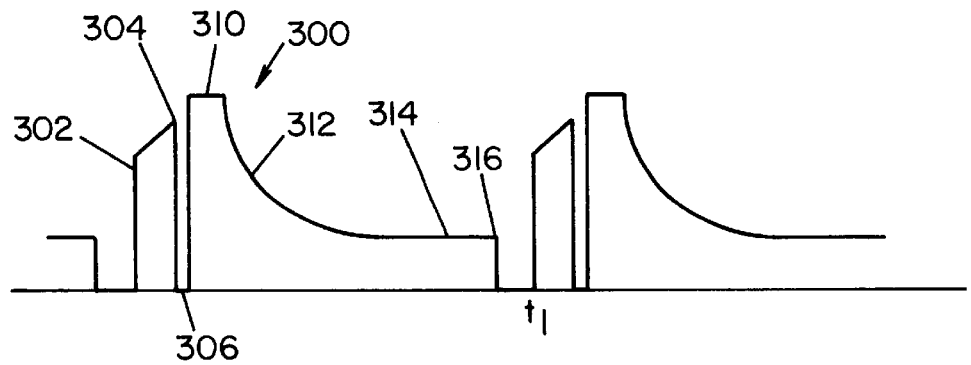
FIG. 7 is a graph of the weld current with straight polarity.
Figure 8:
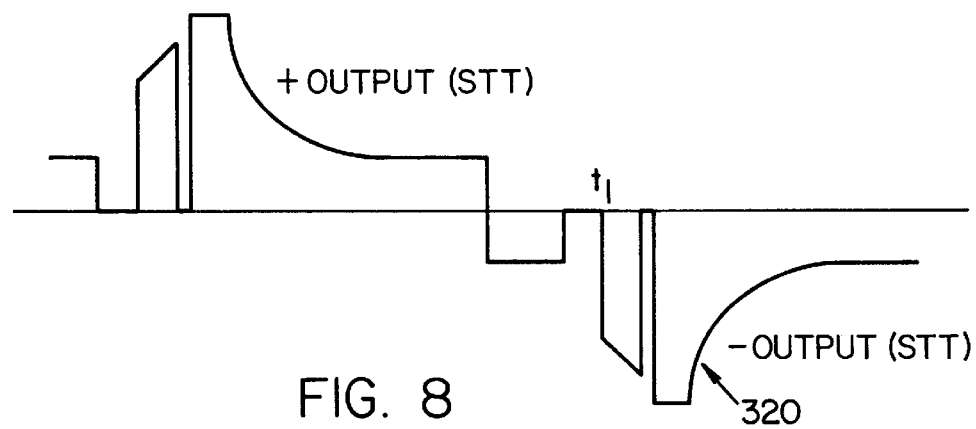
FIG. 8 is a graph of the weld current with a reverse polarity.
Figure 9:
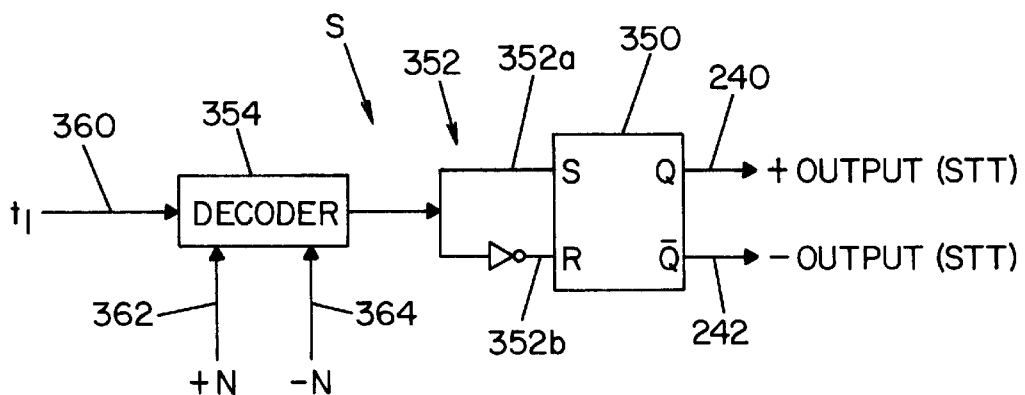
FIG. 9 is a block diagram of the polarity selector used in the illustrated embodiment of the present invention.

FIGS. 4 and 5 show a standard STT short circuit welding cycle with the cycle in FIG. 4 applying the positive terminal to the advancing wire 50. With this polarity, the molten metal puddle is relatively cool compared to the standard STT welding cycle shown in FIG. 5 wherein the electrode is negative. The short circuit welding process utilizing the standard negative polarity, or electrode negative condition shown in FIG. 5, has a tendency to increase the temperature of the molten metal. This condition is normally alleviated by reducing the background current of the STT welder. By employing another aspect of the present invention, the temperature of the molten metal puddle is controlled by welder 200 operated in accordance with the present invention and shown in FIG. 6. Welder 200 applies a welding pulse across the advancing cord metal electrode 50 as the electrode or wire moves toward workpiece 60. The primary aspect of the present invention is the use of a cord electrode. The additional aspect of the invention can use a solid wire electrode. Welder 200 includes a switching type power supply 202 in the form of an inverter having switching pulses controlled by pulse width modulator 204 with the width of the successive current pulses determined by the voltage at the output of error amplifier 206. This amplifier receives a voltage from current shunt 208 that is proportional to the actual arc current. Input line 210 directs the current voltage to the amplifier with the desired current signal in line 212 from standard controller 220. Controller 220 creates a voltage in line 212 that sets the width of the individual rapidly occurring current pulses at the output of inverter or power supply 202. Output stage 230 of inverter 202 includes a transformer 232 having center tap 234 connected to a positive rectifier 236 and a negative rectifier 238. A polarity selector in controller 220 provides a logic in output 240 when the output of the power supply is to have a positive polarity and a logic in output line 242 when the power supply is to be shifted into a negative polarity. Switches Q1, Q2, each having a standard snubber 244, are used to control current in inductor L1 having a positive polarity portion 250 controlled by switch Q1 and a negative polarity portion 252 controlled by switch Q2. A logic in line 240 closes switch Q1 causing current flow through inductor portion 250. A logic in line 242 changes the polarity causing current flow in negative polarity portion 252 of inductor L1. So long as the polarity is positive by the logic in line 240, the STT welder produces positive current pulses to give the positive polarity current cycle shown in FIG. 7. Weld cycle 300 is shown as a positive cycle with all current having a positive polarity. Cycle 300 has a starting point at $t_1$ which is at the time a short occurs. The background current is reduced toward zero. Thereafter, the pinch current 302 causes the shorted metal ball to transfer by a tension transfer and an electrical pinch until a neck is created, as indicated at 304. The current is again plunged as indicated at portion 306 to reduce spatter. After the metal has been transferred by the electric pinch action, the plasma condition is reestablished by a plasma boost pulse 310 having a maximum arc current. The area of the plasma boost pulse 310 determines the general size of the molten metal ball at the end of the advancing wire electrode 50. After the boost pulse, the current has a time constant tailout 312 terminating at the background current 314. At 316 the next short circuit occurs. As long as a logic 1 appears in output 240 the rapidly created current pulses have a positive polarity, as shown in FIG. 7. Upon receipt of a logic one in output line 242, the polarity of the welding operation is reversed. A reversed or negative polarity cycle 320 is created, as shown in FIG. 8. In accordance with this aspect of the invention, the number of positive polarity current cycles 300 and negative polarity current cycles 320 are controlled to obtain the desired heat in the molten metal puddle of the welding operation. If the puddle is too cold, the number of negative polarity cycles 320 is increased with respect to the number of positive current cycles 300. The desired ratio is obtained by appropriate selector circuit in controller 220, which selector circuit is illustrated schematically in FIG. 9 wherein the selector circuit is a flip-flop 350, software implemented, having a non-inverted output 240 and an inverted output 242. The output is selected by anti-coincident circuit 352 having a set input line 352a and a reset input line 352b controlled by a digital decoder 354. Input 360 receives an input initiation pulse at time $t_1$ when a cycle is started by a short circuit. The adjusting inputs 362, 364 of decoder 354 set the ratio of a number of positive current cycles at input 362 and the number of negative current cycles at input 364. By adjusting these two inputs, the ratio of positive current cycles 300, two negative current cycles 320 is selected to control the heat of the welding process. To change the heat, the ratio is manipulated by changing the data at inputs 362 and 364.

Figure 10:
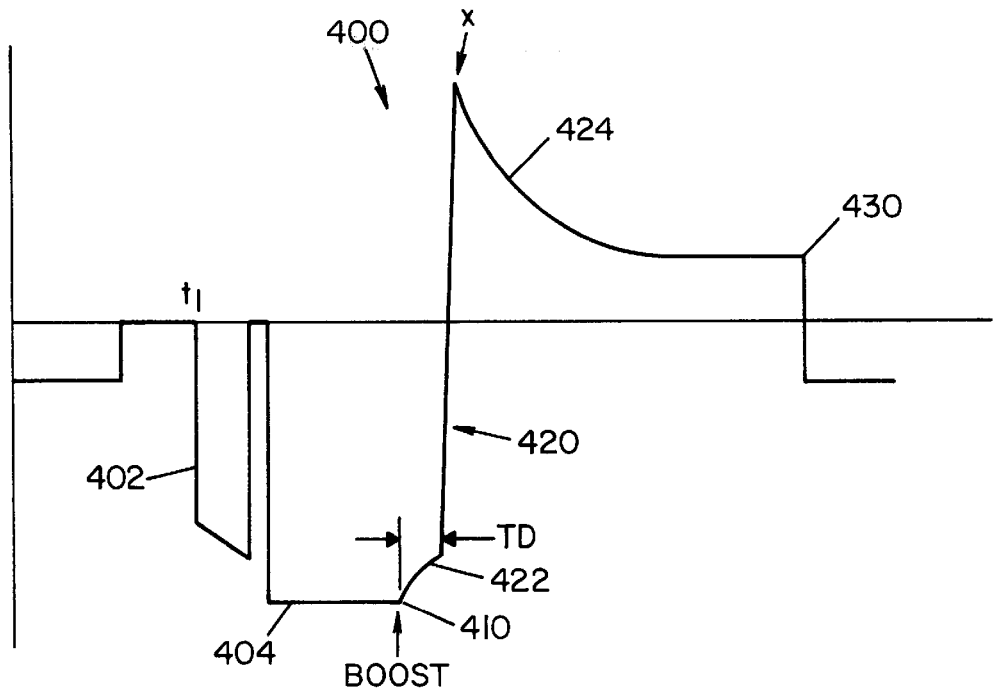
FIG. 10 is a graph of the weld current showing a modification of the preferred embodiment; and, FIG. 11 is a block diagram of the polarity selector used to shift from one polarity to the other polarity during a welding cycle.
Figure 11:
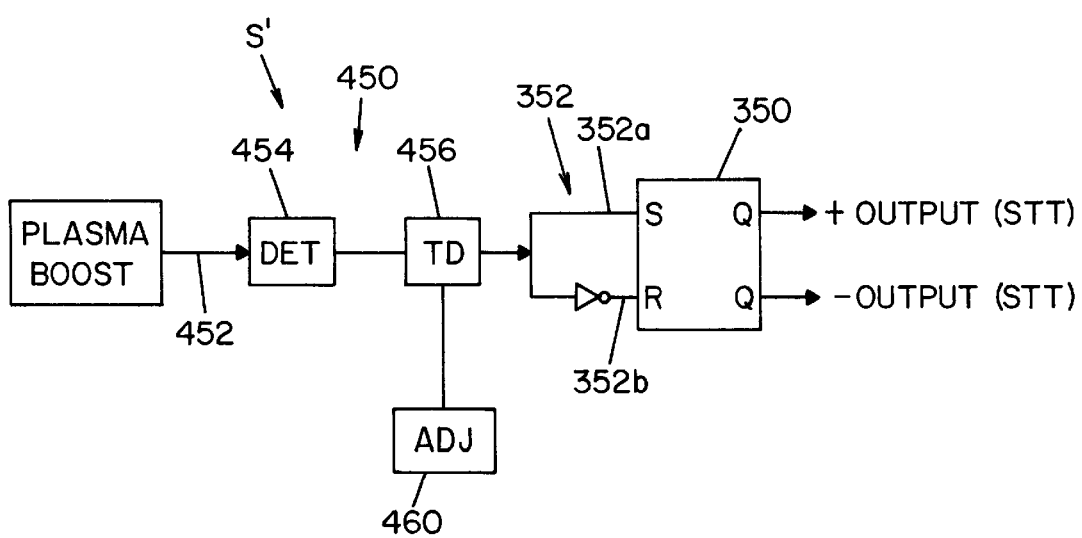

Although the preferred embodiment of this aspect of the invention involves the selection of the ratio between the positive current cycles 300 and the negative current cycles 320 during a welding process, an alternative control concept has been devised wherein each cycle 302 is initiated as a standard negative polarity cycle and is then shifted to a positive polarity cycle at a preselected point in the cycle. This aspect of the invention is illustrated in FIG. 10 wherein current cycle 400 is started as a negative polarity cycle with the pinch current portion 402 followed by a standard plasma boost current portion 404. In accordance with this aspect of the invention, the polarity of the rapidly created current pulses is shifted after the termination 410 of plasma boost portion 404. The shift at point x is after time delay TD. Thus, tailout portion 420 is divided into a negative portion 422 and a positive portion 424 with an instantaneous shift in polarity at point x. Thereafter, the current cycle is a positive polarity until the end 430 of the cycle. Flip-flop 350 shifts logic state to await the next output of trailing edge detector 454 as shown in selector S' in FIG. 11. At the end of a plasma boost portion, detector 454 reads the trailing edge at input 452 to start time delay 456 which has a manual adjusted time at input 460. In this manner, the heat of the weld puddle is determined by the selection of the time delay for reversing the polarity of weld cycle 400. Other modifications could be made to alternate between a positive polarity and a negative polarity for the current pulses from the STT welder for controlling the heat of the welding operation.

The aspects of the invention have been described with reference to preferred and alternative embodiments. Other modifications are apparent and are within the scope of the present invention.

Having thus defined the invention, the following is claimed:

1. An apparatus for electric arc welding two spaced ends of two metal plates at a groove between said two metal plates by melting an advancing welding wire and depositing said melted wire into said groove to join said spaced ends, said apparatus comprising: a switching power supply for creating a series of small width current pulses constituting a welding cycle with a short circuit transfer portion and a plasma arc melting portion, said current pulses in said cycle each having a given electrical polarity of said advancing wire with respect to said two metal plates; and, selector means for selecting the polarity of said pulses in said cycle between a first polarity with said wire being positive and a second polarity with said wire being negative, said power supply includes a center tapped inductor with a first portion creating said first polarity and a second portion creating said second polarity, a first switch for connecting said first portion of said inductor between said wire and said plates, a second switch for connecting said second portion of said inductor between said wire and said plate, and said selector means including means for closing either said first switch or said second switch during a given weld cycle.

2. An apparatus as defined in claim 1 wherein said selector means includes shifts between said first polarity and said second polarity at the beginning of a welding cycle.

3. An apparatus as defined in claim 2 wherein said selector means includes a decoder with a first condition for selecting one of said first or second polarity for a first number of consecutive welding cycles and a second condition for selecting the other of said polarity for a second number of consecutive cycles and means for alternating between said first and second conditions during a welding operation.

4. An apparatus as defined in claim 2 wherein said first number is different from said second number.

5. An apparatus as defined in claim 4 wherein said cycles each have desired arc current and including a shunt to sense the actual arc current and an error amplifier to compare said actual arc current with said desired arc current to control the width of said current pulses.

6. An apparatus as defined in claim 5 including a pulse width modulator for creating said current pulses at a frequency greater than about 10 kHz.

7. An apparatus as defined in claim 6 wherein said power supply is an inverter with an output transformer driving a rectifier.

8. An apparatus as defined in claim 7 wherein said closing occurs at the beginning of a weld cycle.

9. An apparatus as defined in claim 8 wherein said wire is a cored metal electrode.

10. An apparatus as defined in claim 2 wherein said power supply is an inverter with an output transformer driving a rectifier.

11. An apparatus as defined in claim 10 wherein said closing occurs at the beginning of a weld cycle.

12. An apparatus as defined in claim 1 wherein said power supply is an inverter with an output transformer driving a rectifier.

13. An apparatus as defined in claim 12 wherein said closing occurs at the beginning of a weld cycle.

14. An apparatus as defined in claim 12 including a pulse width modulator for creating said current pulses at a frequency greater than about 10 kHz.

15. An apparatus as defined in claim 1 wherein said closing occurs at the beginning of a weld cycle.

16. An apparatus as defined in claim 1 wherein said selector means includes a decoder with a first condition for selecting one of said first or second polarity for a first number of consecutive welding cycles and a second condition for selecting the other of said polarity for a second number of consecutive cycles and means for alternating between said first and second conditions during a welding operation.

17. An apparatus as defined in claim 16 wherein said first number is different from said second number.

18. An apparatus as defined in claim 17 wherein said wire is a cored metal electrode.

19. An apparatus as defined in claim 16 wherein said wire is a cored metal electrode.

20. An apparatus as defined in claim 16 including a pulse width modulator for creating said current pulses at a frequency greater than about 10 kHz.

21. An apparatus as defined in claim 1 wherein said cycles each have desired arc current and including a shunt to sense the actual arc current and an error amplifier to compare said actual arc current with said desired arc current to control the width of said current pulses.

22. An apparatus as defined in claim 21 including a pulse width modulator for creating said current pulses at a frequency greater than about 10 kHz.

23. An apparatus as defined in claim 1 including a pulse width modulator for creating said current pulses at a frequency greater than about 10 kHz.

24. A method for electric arc welding two spaced ends of two metal plates at a groove between said two metal plates by melting an advancing welding wire and depositing said melted wire into said groove to join said spaced ends, said method comprising the steps of:

(a) providing a power supply creating a series of small width current pulses constituting a welding cycle with a short circuit transfer portion and a plasma arc melting portion, said current pulses in said cycle each having a given electrical polarity of said advancing wire with respect to said two metal plates;

(b) selecting the polarity of said pulses in said cycle between a first polarity with said wire being positive and a second polarity with said wire being negative, said power supply includes a center tapped inductor with a first portion creating said first polarity and a second portion creating said second polarity;

(c) connecting said first portion of said inductor across said wire and said plates by closing a first switch;

(d) connecting said second portion of said inductor across said wire and said plate by closing a second switch; and, (e) closing either said first switch or said second switch at a selected position in a given weld cycle.

25. The method as defined in claim 24 including the additional step of:

(c) shifting between said first polarity and said second polarity at the beginning of a welding cycle.

26. The method as defined in claim 25 wherein said cycles each have desired arc current and including the steps of sensing the actual arc current and comparing said actual arc current with said desired arc current to control the width of said current pulses.

27. An apparatus as defined in claim 26 including the step of creating said current pulses at a frequency greater than about 10 kHz.

28. A method as defined in claim 26 wherein said wire is a cored metal electrode.

29. The method as defined in claim 24 including the additional steps of:

(c) selecting one of said first or second polarity for a first number of consecutive welding cycles and a second condition for selecting the other of said polarity for a second number of consecutive cycles; and, (d) alternating between said first and second conditions during a welding operation.

30. The method as defined in claim 29 wherein said first number is different from said second number.

31. The method as defined in claim 24 including the step of creating said current pulses at a frequency greater than about 10 kHz.

32. A method as defined in claim 31 wherein said wire is a cored metal electrode.

33. The method as defined in claim 24 wherein said power supply is an inverter with an output transformer driving a rectifier.

34. The method as defined in claim 24 wherein said selected position is at the beginning of said given weld cycle.

35. A method as defined in claim 24 wherein said wire is a cored metal electrode.

36. A method of arc welding two spaced ends of two metal plates at a groove between the two plates which defines a gap by melting an advancing welding wire and depositing the melted wire into said groove to form a weld pool that closes the gap between said two metal plates, said method comprising the steps of:

a) providing a metal electrode;

b) moving said electrode toward said groove as said electrode is moved along said groove;

c) melting said electrode by an electric wave, said electric wave including a series of current pulses that constitute a welding cycle, said current pulses in said cycle each having a given electrical polarity with respect to said metal plates;

d) selecting the polarity of said pulses in said welding cycle between a first polarity with said electrode being positive and a second polarity with said electrode being negative to control the temperature of said weld pool in said groove; and e) alternating between said first and said second polarity during at least one welding cycle, said alternating polarity being a function of the cumulative amount of energy applied to said electrode and said weld pool in one polarity and the cumulative amount of energy applied to said electrode and said weld pool in the other polarity.

37. The method as defined in claim 36, including the step of selecting the polarity of said pulses in said welding cycle between said first polarity and said second polarity to control the rate of melting of said electrode.

38. The method as defined in claim 36, wherein said metal electrode is a self-shielding electrode.

39. The method as defined in claim 36, wherein said metal electrode is a cored electrode includes alloying components in the core.

40. The method as defined in claim 36, including the step of providing a welding carriage which moves said electrode about the outer peripheral surface of said metal plates.

41. The method as defined in claim 40, wherein the speed of said welding carriage is varied as said carriage moves about said pipe sections.

42. The method as defined in claim 36, wherein said electric wave includes a background current, said background current having a high inductance component and a low level just above the level necessary to sustain an arc throughout each welding cycle.

43. The method as defined in claim 36, wherein said two metal plates are two pipe sections.

44. The method as defined in claim 36, wherein said electric wave includes a transfer portion and a controlled melting portion, said melting portion having a preselected I(t) area for melting a relatively constant volume of said electrode during each welding cycle.

45. The method as defined in claim 36, wherein said step of melting said electrode including the application of a preselected amount of energy to said electrode during at least one welding cycle and reducing current to said electrode prior to molten metal on said electrode forming a short circuit condition with said groove.

46. The method as defined in claim 36, wherein said electric wave limiting energy to said electrode to prevent molten metal from passing through said gap.

47. The method as defined in claim 36 including the additional step of shifting between said first polarity and said second polarity at the beginning of a welding cycle.

48. The method as defined in claim 36 including the additional step of selecting one of said first or second polarity for a first number of consecutive welding cycles and a second condition for selecting the other of said polarity for a second number of consecutive cycles.

49. The method as defined in claim 48 wherein said first number is different from said second number.

50. The method as defined in claim 36 wherein said cycles each have desired arc current and including the steps of sensing the actual arc current and comparing said actual arc current with said desired arc current to control the width of said current pulses.

51. The method as defined in claim 36 wherein said power supply creates alternating current.

52. The method as defined in claim 36, wherein said power supply is an STT power supply.

53. The method as defined in claim 36, wherein said metal electrode does not require external gas shielding.

* * * * *